United States Patent [19]

McConnell

[11] Patent Number: 5,006,033
[45] Date of Patent: Apr. 9, 1991

[54] CARRIER VEHICLE WITH TILT LOCK-OUT ARRANGEMENT

[75] Inventor: Ralph E. McConnell, Chattanooga, Tenn.

[73] Assignee: Century Wrecker Corporation, Ooltewah, Tenn.

[21] Appl. No.: 376,880

[22] Filed: Jul. 7, 1989

[51] Int. Cl.⁵ .............................................. B60P 1/16
[52] U.S. Cl. ...................................... 414/477; 298/14; 298/22 C; 91/445; 91/189 R; 414/478; 414/480
[58] Field of Search ............... 414/477, 478, 479, 480, 414/469, 491, 494; 298/12, 14, 22 C; 901/46; 60/426, 463; 91/361, 445, 189; 92/5 R, 5 L

[56] References Cited

U.S. PATENT DOCUMENTS

| 2,466,452 | 4/1949 | Lisota . | |
|---|---|---|---|
| 3,083,849 | 4/1963 | Mottin . | |
| 3,414,148 | 12/1968 | Bishop | 414/477 |
| 3,450,282 | 6/1969 | Ezolt . | |
| 3,454,175 | 7/1969 | Kellaway . | |
| 3,485,400 | 12/1969 | Pewthers . | |
| 3,695,710 | 10/1972 | Cresci et al. | 298/22 C X |
| 3,812,988 | 5/1974 | Pyle . | |
| 3,945,299 | 3/1976 | Fritz et al. | 91/445 X |
| 4,139,236 | 2/1979 | Hill, et al. . | |
| 4,225,280 | 9/1980 | Brunet et al. . | |
| 4,236,756 | 12/1980 | Hildebrand et al. . | |
| 4,236,757 | 12/1980 | Gregory | 298/22 C |
| 4,508,388 | 4/1985 | Minami | 298/22 C |
| 4,508,388 | 4/1985 | Minami . | |
| 4,514,131 | 4/1985 | Godwin, Sr. | 414/480 |
| 4,635,439 | 1/1987 | Wible | 60/426 X |
| 4,641,388 | 2/1987 | Bennett et al. | 91/189 R X |
| 4,643,074 | 2/1987 | Gunda et al. | 91/361 |
| 4,756,658 | 7/1988 | Moore et al. . | |
| 4,860,639 | 8/1989 | Sakaguchi | 92/5 R |
| 4,896,584 | 1/1990 | Stoll et al. | 92/5 R |

FOREIGN PATENT DOCUMENTS

| 56-131435 | 10/1981 | Japan | 414/477 |
|---|---|---|---|
| 1-109135 | 4/1989 | Japan | 414/477 |
| WO83/01661 | 5/1983 | PCT Int'l Appl. | 91/445 |

Primary Examiner—Robert J. Spar
Assistant Examiner—Robert S. Katz
Attorney, Agent, or Firm—Brooks & Kushman

[57] ABSTRACT

A carrier vehicle, for carrying at least one vehicle on a carrier bed which is slidable and tiltable relative to the carrier vehicle's frame, includes a tilt lock-out arrangement for preventing actuation of the carrier vehicle's tilt cylinders whenever the moveable carrier bed is locked in a stowed, or vehicle carrying position. The lock-out arrangement features a contactless sensor element which determines the slidable position of the movable carrier bed and inhibits hydraulic activation of the tilt cylinders to raise or lower the carrier bed unless the carrier bed has first been slid rearwardly to clear a mechanical hold-down element. Similarly, the contactless sensor element inhibits hydraulic actuation of the tilt cylinder to lower the carrier bed unless the bed has cleared the hold-down element.

17 Claims, 3 Drawing Sheets

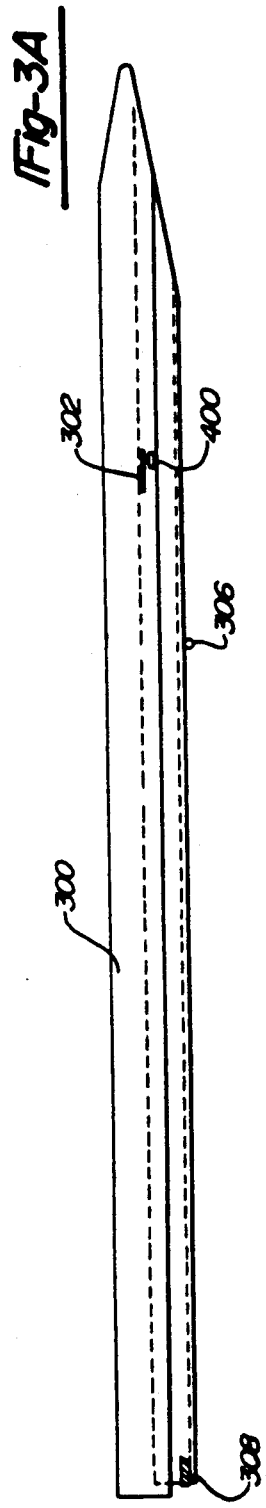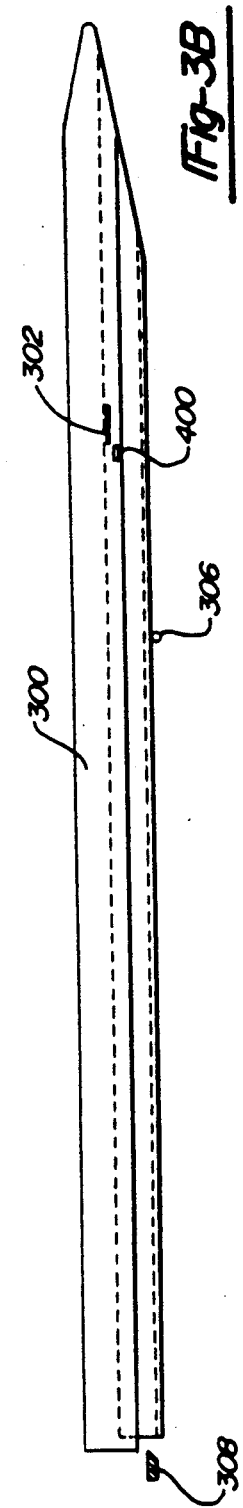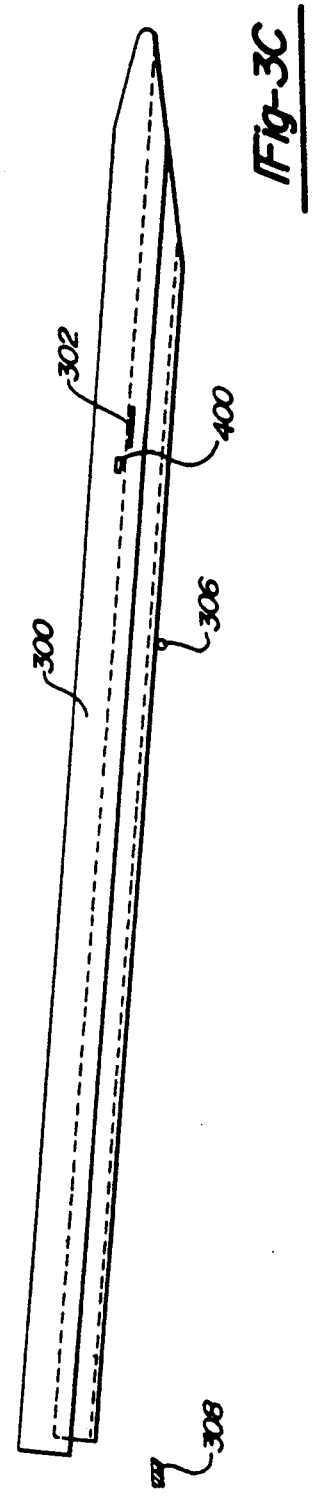

CARRIER VEHICLE WITH TILT LOCK-OUT ARRANGEMENT

BACKGROUND OF THE INVENTION

The invention relates generally to a carrier vehicle with a moveable bed which is maneuverable to load and unload other vehicles, such as disabled cars, racing vehicles, etc. More specifically, the invention concerns an arrangement for preventing inadvertent tilting of the moveable bed when the bed is engaging a hold-down device associated with the carrier vehicle frame.

Typical known vehicle carriers with which this invention is concerned provide a positive lock-down element which engages the moveable carrier bed as it slides forward into its normal position to maintain the bed in its load carrying orientation. In such systems however, users have experienced problems with personnel forgetting that the carrier bed has been engaged by the lock-down element and proceeding to engage the vehicle's hydraulic system to begin tilting of the bed thereby causing damage to the lock-down device and to the truck chassis itself. Known solutions to preventing this problem by providing a tilt lock-out arrangement have used a mechanical means to physically prevent a lever or crank associated with the hydraulic tilt control system from being physically actuated. One such known arrangement is disclosed in U.S. Pat. No. 4,756,658 to Moore et al. Moore utilizes a mechanical stop-plate secured to the carrier bed in conjunction with a cam element coupled to a linkage control rod of the hydraulic actuator system. The stop-plate is disposed such that when engaged by the cam, the cam, and thus the control rod are precluded from turning thereby inhibiting the passage of a tilt command to the hydraulic system which, in turn, prevents tilting of the carrier bed.

Other known tilt lock-out arrangements utilize moveable contacts of a limit switch with a probe positioned to detect the position of the carrier bed and in accordance with that position to either inhibit or allow hydraulic fluid flow to a tilt control cylinder at preselected longitudinal positions of the carrier bed.

SUMMARY OF THE INVENTION

Accordingly, it is an object of the invention to provide a tilt lock-out arrangement which avoids the necessity for physically inhibiting movement of a tilt control knob of the hydraulic system and which further eliminates the need for position detecting switches with movable contacts.

The improved tilt lock-out arrangement for a carrier vehicle having the carrier bed arranged for translational movement with respect to a portion of the carrier vehicle comprises a control signal generator, such as a magnetic field generator, a contactless sensor coupled to either the carrier bed or the frame means and operative upon sensing the control signal to generate a lock-out signal at a sensor means output and further operative whenever not sensing the control signal to generate an enable signal at the sensor output, and control means coupled to the sensor means output and to a bed tilting means, such as a hydraulic cylinder, operative upon receipt of the lock-out signal to disable the tilt means.

BRIEF DESCRIPTION OF THE DRAWING

The objects and features of the invention will become apparent from a reading of a detailed description taken in conjunction with the drawing, in which:

FIGS. 3A, 3B and 3C are side plan views of the carrier bed of the vehicle carrier of FIGS. 1 and 2 shown respectively in the stowed, or nondeployed position for transporting a vehicle on the bed, with the bed shown extended rearwardly of the truck portion such that the carrier bed has cleared a locking block, and with the carrier bed shown extended rearwardly and tilted into a vehicle loading position;

DETAILED DESCRIPTION

Figure 1:
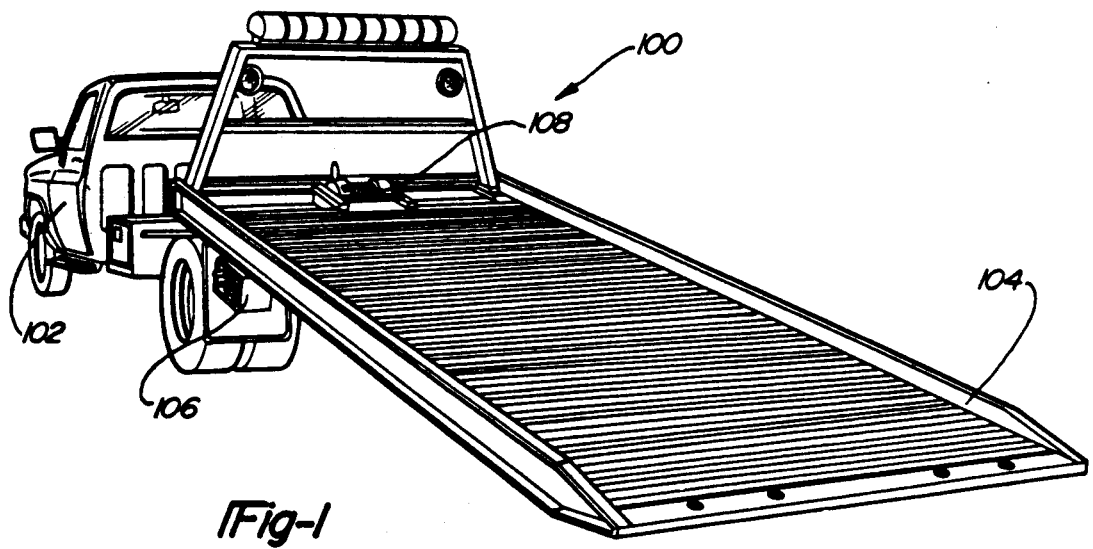
FIG. 1 is a perspective view of a carrier vehicle in which the tilt lock-out arrangement of the invention is used, the vehicle being shown with its moveable carrier bed tilted to the vehicle loading position with a rearward most end of the vehicle in contact with the support surface upon which the carrier vehicle rides.
Figure 2:
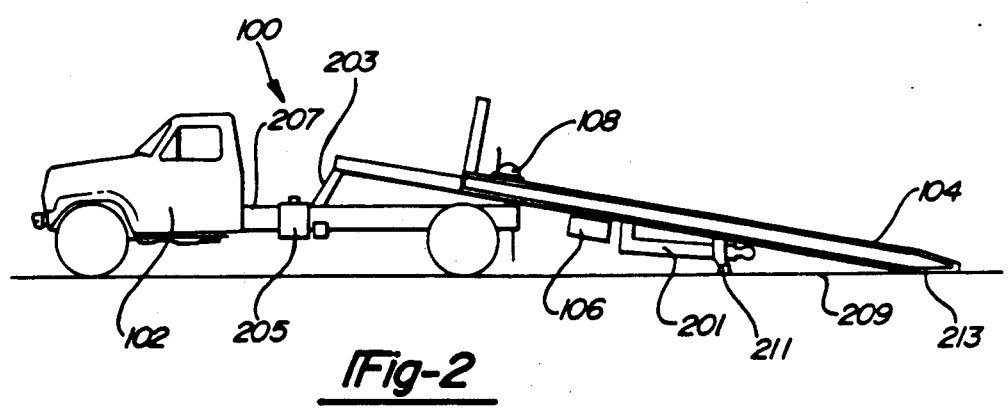
FIG. 2 is a side plan view of the vehicle carrier of FIG. 1.

A carrier vehicle in which the invention is applicable is set forth in FIGS. 1 and 2. Carrier vehicle 100 includes a motorized cab 102 which hauls a carrier portion including a movable carrier bed 104 which can be tilted via hydraulic controls 106 from a tilted or loading position shown in FIG. 1 to a substantially horizontal orientation for actual transport of a disabled vehicle or the like. The vehicle to be transported is loaded onto the carrier bed 104 via a cable and winch assembly 108.

As seen from FIG. 2, movable carrier bed 104 can slide rearwardly from the horizontal or stowed position with reference to a truck frame 207 and can be tilted via tilt cylinder assembly 203 to the position shown in FIGS. 1 and 2. In the tilted or loading orientation, the rearwardmost portion 213 of the carrier bed 104 is in abutting contact with the ground or road surface 209 upon which a carrier vehicle 100 rides. Additionally, the carrier vehicle may include an optional tow bar assembly 201 for towing an additional vehicle behind the movable carrier bed in addition to a vehicle which may be placed on that bed.

Typically, the vehicle carrier is totally hydraulic and receives power from the truck engine of motorized cab 102 by means of a power take-off/pump combination attached to the truck transmission (not specifically shown). Each function of the movable carrier bed is typically controlled from the control station 106. Typical control functions provided are forward and rear translational movement of bed 104, tilting of bed 104 either toward the ground or back toward the substantially horizontal orientation, control of the optional tow bar, and control of the winch and cable assembly 203.

The bed 104 is tilted by a tilt cylinder assembly 203 comprised, for example, of a pair of hydraulic cylinders which will be discussed in more detail in a later section of this description.

The typical sequence of operation for the carrier vehicle of FIGS. 1 and 2 would be to first line up the vehicle carrier bed with a vehicle to be transported thereon, then to depress a bed travel lever to slide the carrier bed 104 rearwardly of cab 102 until a hold-down lock which engages the bed in its normal stowed condition has been cleared. Typically, a visual aid (not specifically shown) may be painted near the control box 106 to enable the operator to see when sufficient clearance in a rearward direction of bed slide travel has been attained.

Next the operator would depress a bed tilt lever at control box 106 to pivot the carrier bed 104 until stabilizer 211 (FIG. 2) makes contact with the ground. At this point using the bed travel lever, the operator would continue to slide the carrier bed rearwardly until it touches the ground 209. At this point, the vehicle to be transported would be attached with hook-up chains to the winch cable and pulled up the bed surface via the cable and winch assembly 108.

Once the vehicle to be transported has been secured by appropriate safety chains or the like, the operator would then via an appropriate knob at control box 106 slide the carrier bed 104 forwardly towards the cab until the end 213 of carrier bed 104 has cleared the ground surface and the front most end of carrier bed 104 is not yet in the vicinity of the lock-down block. At this point carrier bed 104 would be pivoted or tilted in the opposite direction towards its substantially horizontal orientation, and then the bed would be slid forwardly to engage the locking block to complete the loading operation.

When the above procedure is correctly followed, there is actually no need for the lock-out arrangement of the invention. However, it has been found in practice that either due to poor training, or hasty action or stressful conditions attendant to loading a disabled vehicle onto a carrier for removal from an accident scene, operators may often attempt to tilt the carrier bed 104 when it is engaged by a locking block associated with a fixed frame of the vehicle, or alternatively operators may sometimes attempt to lower the tiltable bed 104 onto the top of such a locking block prior to its proper engagement with the sliding bed. Hence, it has become desirable to provide an anti-tilt feature in vehicle carrier systems such as that described above.

The general features of the invention may be explained with reference to FIGS. 3A, 3B and 3C which show the movable carrier bed of a vehicle carrier in three different orientations with respect to a lock block mounted to the carrier vehicle frame.

As seen in FIGS. 3A, 3B and 3C, a carrier bed 300 has a signal generator 302 such as a permanent magnet or an electromagnet mounted thereto. When the carrier bed is in its stowed, substantially horizontal position as shown in FIG. 3A, a portion of the bed 300 slidably engages a lock block 308 mounted to a fixed portion of the carrier vehicle (not specifically shown in these drawings). This lock block 308 provides a positive lock down feature for the carrier bed 300 when transporting a vehicle thereon. The signal generator, such as a permanent magnet 302, is mounted to the carrier bed relative to a magnetic field sensor 400, which is mounted to a portion of the vehicle carrier which does not translationally slide with carrier bed 300 (this vehicle portion is not specifically shown in these figures). Magnetic sensor 400 may, for example, comprise an integrated circuit utilizing a magnetoresistive element which alters its electrical resistance in the presence of a magnetic field such as that generated by a permanent magnet at 302.

With bed 300 at rest in a locked position shown in FIG. 3A, the rear portion of magnet 302 is located such that the magnetic sensor 400 is placed within the magnetic flux field generated by magnet 302. As long as the sensor 400 is within the field, the sensor will provide an output which may be utilized by a anti-tilt valve in the hydraulic system (to be described below) such that the flow of hydraulic fluid to and from the bed tilt cylinders may be inhibited to prevent tilting of bed 300 while engaged by lock block 308.

When bed 300 has been translationally slid rearwardly (i.e. to the right as shown in FIG. 3B) magnet 302 will cease coupling a magnetic field to sensor 400 when the sliding movement is sufficient for the bed 300 to clear lock block 308. At this point, the output of the magnetic sensor is switched such that the control valve in the hydraulic system will allow for passage of hydraulic fluid to and from the tilt cylinders thereby rendering the actuation of a tilt control lever at control box 106 (FIG. 2) effective to raise or lower carrier bed 300. (The bed 300 is shown in such a tilted position in FIG. 3C.)

When bed 300 is brought forward again, the sequence is reversed. As the flux field generated by element 302 moves back over sensor 400, the hydraulic system will once again be disabled and no hydraulic fluid will pass to the tilt cylinders.

Figure 4:
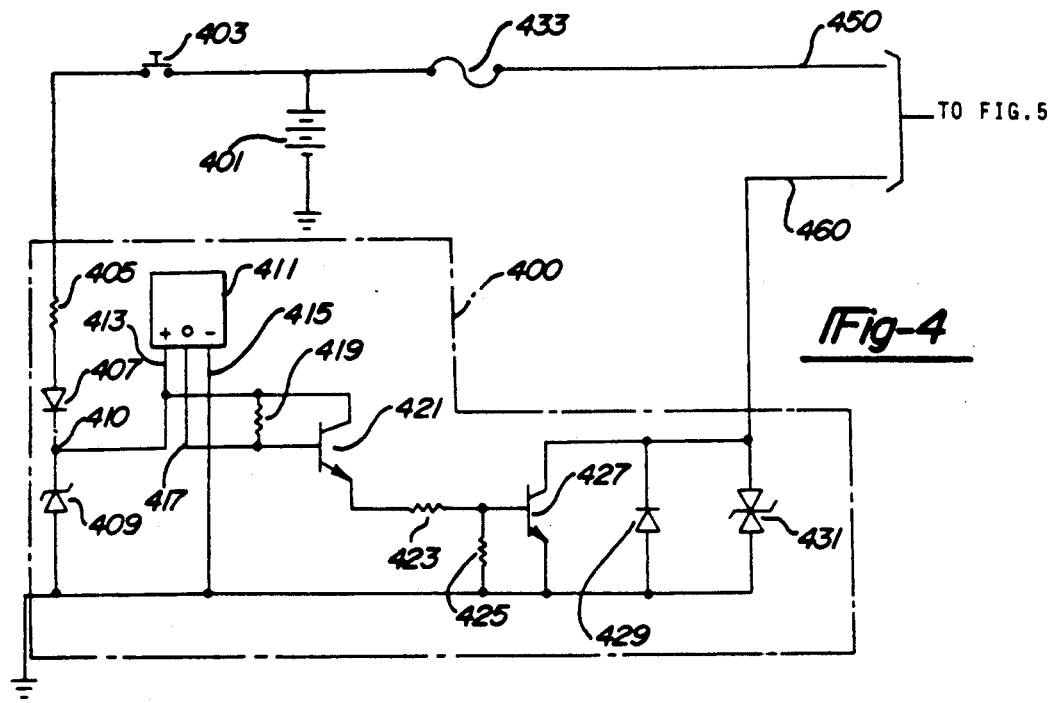
FIG. 4 is a schematic diagram of a contactless sensor device suitable for use in accordance with the principles of the invention.
Figure 5:
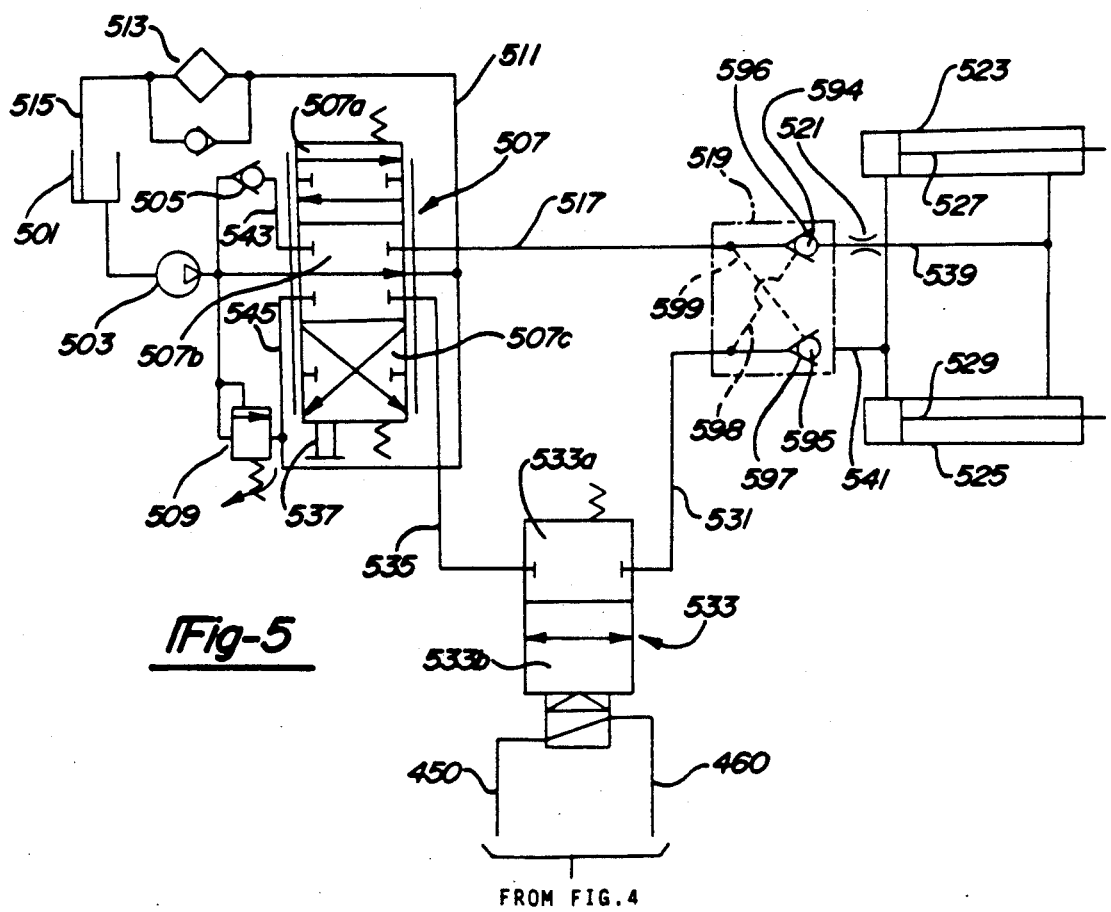
FIG. 5 is a functional schematic diagram of a hydraulic control arrangement for use with the output of the sensor of FIG. 4 in effecting the lock-out function in accordance with the principles of the invention.

A suitable sensor arrangement 400 and accompanying hydraulic controls for use therewith in accordance with the operation set forth above with respect to FIGS. 3A, 3B, 3C are set forth in FIGS. 4 and 5.

With reference to FIG. 4, sensor 400 utilizes, for example, an integrated circuit position sensor 411 utilizing magnetoresistive material, which alters its electrical resistance when subjected to magnetic flux.

Digital position sensor 411 could, for example, comprise a type SS2 sensor commercially available from MICROSWITCH, a division of HONEYWELL, INC. Alternatively, a Hall effect device could be utilized as the sensor element shown.

Element 411 provides a current sinking output at pin "0" at lead 417 whenever element 411 is within a predetermined distance of a field generating device such as a permanent magnet. When not in the presence of such a field, the output at lead 417 goes to a non-current sinking high impedance state.

The circuitry of sensor 400 is powered from the carrier vehicle's battery 401 via a power take-off switch 403. A positive terminal of vehicle battery 401 is coupled via switch 403 to a resistor 405, thence to a battery polarity detection diode 407 at an anode electrode thereof. A cathode electrode of diode 407 is coupled at node 410 to a cathode electrode of surge protection zener diode 409 and to a "+" pin of magnetoresistive sensor 411 via lead 413. The anode electrode of zener diode 409 is coupled to ground potential, which is also coupled to a "−" pin of element 411 via lead 415.

The magnetic field detection output of element 411 at lead 417 is coupled to a first terminal of resistor 419 and to the base electrode of NPN transistor 421. A collector electrode of transistor 421 is coupled to a second terminal of resistor 419 and to the cathode electrode of zener diode 409. An emitter electrode of transistor 421 is coupled via resistor 23 to the junction of a first terminal of resistor 425 and a base electrode of NPN transistor 427. An emitter electrode of transistor 427, along with a second terminal of resistor 425 is coupled to ground potential.

A collector electrode of transistor 427 is coupled to output lead 460 of sensor 400. Inductive surge protection diode 429 has a cathode electrode also coupled to output 460 and an anode electrode coupled to ground potential at a junction with the emitter electrode of transistor 427. Additionally coupled across the collector and emitter electrodes of transistor 427 is an inductive surge protection varistor 431.

A positive terminal of carrier vehicle battery 401 is additionally coupled via an ignition switched fuse circuit 433 to output lead 450.

In operation, sensor 400 when within a predetermined distance of a magnetic field generator (such as permanent magnet 302 of FIG. 3A) will provide a digital current sinking output at path 417 which will divert the base drive current intended for transistor 421 thereby rendering transistor 421 nonconductive. In a nonconductive state, transistor 421 will not provide base drive to transistor 427 which, in turn, will be held to the off or high impedance state between its collector and emitter electrodes.

With the high impedance state at transistor 427, ground potential will be removed from sensor output lead 460.

When element 411 of sensor 400 is beyond the predetermined distance from the magnetic field generator, its output at path 417 will go to a high impedance state thereby enabling base drive current to reach transistor 421 via resistor 419 to render transistor 421 conductive or in the low impedance state between its collector and emitter electrodes. Current flow from collector to emitter of transistor 421 will provide sufficient base drive via resistors 423 and 425 to transistor 427 which will, in turn, likewise assume a low impedance state in its collector to emitter circuit. In the low impedance state, transistor 427 will enable ground potential to be placed on output lead 460 of sensor 400.

With reference to FIG. 5, a hydraulic control circuit suitable for use in accordance with the invention is set forth. Leads 450 and 460 from the sensor of FIG. 4 are coupled to opposite sides of a solenoid coil of tilt lockout solenoid valve 533. Hence, as seen from the description given above with reference to the circuitry of FIG. 4, whenever sensor 400 is within a predetermined distance of a magnetic field generator such as magnet 302 (FIG. 3A), ground potential will not be supplied via lead 460 and the solenoid coil of valve 33 will not be energized. Under this condition, as seen from the schematic for the solenoid valve 533 the hydraulic line 535 and hydraulic line 531 will be interrupted and no hydraulic fluid flow will occur towards the bed tilt cylinders 523 and 525. Alternatively, when the magnetic field is not present in the vicinity of sensor 400, ground potential will be supplied at path 460 and therefore since a positive battery potential appears at lead 450, the solenoid coil will be energized to connect the hydraulic line from main bed tilt control spool valve 507 to the first and second bed tilt cylinders 523 and 525, respectively.

As further seen from FIG. 5, hydraulic reservoir 501 supplies hydraulic fluid via pump 503 to a main bed tilt control spool valve 507. In the idle condition, spool valve 507 will pass the hydraulic fluid straight through to a return line 511 which will return the hydraulic fluid to reservoir 501 via a hydraulic filter 513 and line 515.

A first hydraulic output line 517 is coupled between spool valve 507 and cylinder lock valve 519. A second hydraulic output 535 of spool valve 507 is coupled to the tilt lockout solenoid valve 533. Hydraulic line 531, in turn runs from solenoid valve 533 to cylinder lock valve 519.

The output of pump 503 is coupled via check valve 505 to a hydraulic input 543 to spool valve 507 and via a relief valve 509 to return line 511.

Spool valve 507 is spring-centered to position 507b and is manually actuated via element 537 to either position 507a or 507c. Upon release of element 537, valve 507 will return under spring force to position 507b. Hydraulic line 545 is coupled to return line 511.

Cylinder lock valve 519 is, in this embodiment, comprised of a double pilot-operated check valve and has a first output coupled via control orifice 521 to hydraulic line 539 which feeds a first side of the head of piston 527 of tilt cylinder 523 and a first side of a piston head 529 of a second bed tilt cylinder 525. A second hydraulic line 541 couples cylinder lock valve 519 to a second side of the piston heads for cylinders 523 and 525. It will be apparent to those skilled in the art that the pistons 527 and 529 of tilt cylinders 523 and 525, respectively, are coupled to a support frame of the moveable carrier bed 104 (FIG. 2) in a manner such that movement of these pistons will effect tilting movement of the carrier bed. The details of such interconnection are not pertinent to the invention and, since they would be apparent to one of ordinary skill in the art, are not set forth herein.

The operation of the hydraulic control apparatus of FIG. 5 may be summarized as follows. Assume that the carrier bed is in its stowed substantially horizontal position and is engaging the lock block 308 (i.e. the position as shown in FIG. 3A). Under this condition, an open circuit will exist between leads 450 and 460, and therefore the actuating coil of solenoid valve 533 will not be energized. In this state, valve section 533a is placed between hydraulic lines 535 and 531 and inhibits flow of hydraulic fluid through this path. Therefore, regardless of the position of control spool valve 507 as dictated by the manual manipulation of element 537, no hydraulic fluid flow to or from cylinders 523 and 525 occurs and the carrier bed 104 will therefore not be tilted.

Next assume that the carrier bed has been slid rearwardly of the cab as shown in FIG. 3B. Under this situation, the magnetic field will no longer be detected by sensor 400 and a coil current supply loop will therefore be established via leads 450 and 460 thereby operating the tilt lockout solenoid valve 533 to place a continuous flow path between hydraulic lines 535 and 531. Under this enabled condition, the hydraulic system will operate in accordance with the manually input commands to bed tilt spool valve 507 via element 537. If no command for tilting is being sent, then section 507b of spool valve 507 merely will return input hydraulic fluid back via filter 513 and line 515 to hydraulic reservoir 501.

To extend pistons 527 and 529 of cylinders 523 and 525, (i.e. to move them to the right as shown in FIG. 5) the operator would, via a control lever at control box 106 (FIG. 2), cause spool valve section 507c to be placed between the input and output hydraulic line of valve 507. Under this condition, hydraulic fluid would be pumped at 503 via check valve 505 from line 543 to line 535 thence via closed path of valve section 533b of solenoid valve 533 to line 531 into cylinder lock valve 519 at a lower check valve leg thereof which is comprised of valve seat 597 and check ball 595. From this point fluid would continue flow via line 541 into a portion of cylinders 523 and 525 to the left of the piston heads.

This hydraulic fluid flow therefore tends to push pistons 527 and 529 to the right as shown in FIG. 5 which will in turn tend to force fluid out of the other sections of the cylinders via line 539 and orifice 521 to check ball 594 of cylinder lock valve 519. However, fluid flow will be stopped by the action of the check ball 594 until pressure in line 541 builds up sufficiently to cause check ball 594 to be lifted from valve seat 596 via pilot line 598. Upon this sufficient pressure backup occurring, check ball 594 will be lifted thereby enabling return flow of hydraulic flow to take place via line 517 thence via spool valve section 507c to hydraulic line 545 which, in turn, is coupled to the return path to the hydraulic reservoir 501. When the carrier bed has been tilted to the desired angle, the operator will release the appropriate control lever and thereby via element 537 return the main bed tilt control spool valve 507 to its idle position to cease flow of hydraulic fluid to and from the bed tilt cylinders 523 and 525. At this point, cylinders 523 and 525 will have their respective pistons 527 and 529 locked in place via the action of the ball check valves of cylinder lock valve 519.

Control orifice 521 is placed in hydraulic line 539 to minimize noise at the cylinder lock valve 519 by stabilizing the flow rate of hydraulic fluid therethrough.

To tilt the carrier bed in an opposite direction (i.e. moving the tilt cylinder pistons from right to lift in FIG. 5), the operator would, through the appropriate control lever at control box 106 (FIG. 2), in an opposite direction to that described above, via element 537, place spool valve section 507a between the valve's input and output lines. In this condition, fluid would flow from pump 503 via check valve 505 and line 543 through spool valve section 507a to hydraulic line 517 and thence via lock valve 519 and orifice 521 to lead 539 where the fluid would be pumped into the cylinder areas behind the piston heads thereby tending to force the pistons 527 and 529 toward the left as shown in FIG. 5. Flow out of the cylinder areas to the left of the piston heads is inhibited by check ball 595 being lodged against valve seat 597 until sufficient back pressure is built up in line 539 and 517 to unseat ball 595 via pilot line 599. Under this condition, return flow of hydraulic fluid from the tilt cylinders 523 and 525 would be enabled via line 531, section 533b of solenoid valve 533, line 535, section 507a of spool valve 507 to line 545 and thence to the hydraulic reservoir 501 via line 511, filter 513 and line 515. As before, when the control lever is released and fluid ceases to flow, the cylinder pistons 527 and 529 will be locked in their new positions by cylinder lock valve 519.

The overall operating pressure of the hydraulic system of FIG. 5 is preselected via adjustable relief valve 509 which, upon a pressure exceeding that selected, will operate valve 509 to allow hydraulic fluid flow directly to the return and bypassing control spool valve 507.

Hence it will be seen from the above description that in accordance with the invention, a tilt lock-out arrangement is furnished which does not require a mechanical inhibiting of movement of the tilt control lever at control box 106. Rather, in accordance with the invention, tilt lock-out is effectuated via contactless position sensing of the carrier bed with respect to a position in which it would normally engage a lock block. The sensor in turn is used to enable or disable hydraulic flow to and from the bed tilt cylinders. In the preferred arrangement, a permanent magnet is used in conjunction with a magnetoresistive integrated circuit sensor. With the bed in a locked position (i.e. engaging a lock block such as 308 of FIG. 3A) a rear portion of a magnet (302 of FIG. A) is located directly over magnetoresistive sensor 400. Magnet 302 is located such that the sensor is at least a sufficient distance within the magnetic flux field to render the actuating coil of a lock-out solenoid valve in the hydraulic circuitry inoperative thereby preventing hydraulic fluid flow to and from the tilt cylinders. This condition will last for so long as the sensor is within the magnetic field.

The magnet is selected to be of a length sufficient to ensure that the magnetic sensor will be actuated thereby until the carrier bed is slid for a distance sufficient to clear the bed from the lock block before the sensor will no longer be activated by the field. No longer detecting the presence of the magnetic field, the sensor will enable a coil current loop to be energized thereby operating the lock-out solenoid valve to enable hydraulic fluid flow to and from the bed tilt cylinders in either of two directions depending upon the operator request passed to the hydraulic system via a suitable control rod. When the carrier bed is brought forward toward the cab again, the sequence will be reversed, and as the magnetic field is again sensed by the sensor, the hydraulic system will once again be disabled and the lift cylinders cannot be actuated to effect tilting.

The invention has been described with reference to a preferred embodiment for the sake of example only. The scope and spirit of the invention are to be determined in accordance with the appended claims.

I claim:

1. In a carrier vehicle having frame means, a carrier bed arranged for translational movement with respect to the frame means, and tilt means coupled to the carrier bed for pivoting the carrier bed between a first position substantially parallel to a supporting surface of the carrier vehicle and a second position in which a rearwardmost end of the carrier bed abuts the supporting surface, the improvement comprising:
   means secured to one of the carrier bed and the frame means, for emitting a control signal,
   proximity type contactless sensor means secured to the other of the carrier bed and the frame means and operative upon sensing the control signal to generate a lock-out signal at a sensor means output, and
   control means coupled to the sensor means output and to the tilt means, operative upon receipt of the lock-out signal to disable the tilt means.

2. The improvement of claim 1 wherein the means for emitting a control signal comprises a magnetic field generator.

3. The improvement of claim 2 wherein the magnetic field generator comprises a permanent magnet.

4. The improvement of claim 2 wherein the contactless sensor means includes a magnetoresistive element.

5. The improvement of claim 1 wherein the tilt means comprises at least one hydraulically actuated cylinder.

6. The improvement of claim 5 wherein the control means comprises a source of hydraulic fluid and valve means coupled between the source of hydraulic fluid and the at least one hydraulically actuated cylinder, the valve means further having a control input coupled to the sensor means output, the valve means operative upon receipt of the lock-out signal at its control input to inhibit flow of hydraulic fluid therethrough.

7. The improvement of claim 6 wherein the valve means comprises a solenoid valve with a solenoid actuating coil coupled to the sensor means output.

8. The improvement of claim 6 wherein the control means further comprises tilt control valve means having a hydraulic input coupled to the source of hydraulic fluid and a hydraulic output coupled to the valve means.

9. The improvement of claim 8 wherein the control means further comprises locking valve means coupled between the valve means and the at least one hydraulically actuated cylinder and operative in a steady hydraulic state to maintain a positional state of the cylinder.

10. The improvement of claim 9 wherein the locking valve means comprises a pilot operated check valve.

11. The improvement of claim further comprising command generator means coupled to the control means for indicating a request for tilting of the carrier bed.

12. The improvement of claim 8 further comprising a manually actuated command generator means coupled to a control input to the tilt control valve means, the tilt control valve means arranged for selectively directing flow of the hydraulic fluid between the hydraulic input and the hydraulic output in accordance with indications received from the manually actuated command generator means.

13. In a carrier vehicle having a carrier bed which is slidable and tiltable relative to a fixed frame of the carrier vehicle, a hold-down device for engaging the carrier bed in a stowed, non-extended and non-tilted position and for preventing tilting of the carrier bed, and at least one tilt cylinder coupled to the carrier bed for pivoting same between a first position substantially parallel to a supporting surface of the carrier vehicle and a second position in which a rearward-most end of the carrier bed abuts the supporting surface for receipt of a carried vehicle, apparatus for preventing inadvertent tilting of the carrier bed when engaged by the hold-down device, the apparatus comprising:

means secured to the carrier bed for generating a magnetic field;

magnetic field sensor means secured to a non-slidable portion of the carrier vehicle and positioned relative to the means for generating such that the sensor means will detect the magnetic field whenever the carrier bed is engaging the hold-down device and generate a lock-out signal at a sensor means output; and control means coupled to the sensor means output and to the at least one tilt cylinder; operative upon receipt of the lock-out signal to prevent the tilt cylinder from pivoting the carrier bed.

14. The apparatus of claim 13 wherein the magnetic field sensor means comprises an electronic circuit utilizing a magnetoresistive element sensitive to the presence and absence of the magnetic field.

15. The apparatus of claim 14 wherein the sensor means further comprises an electronic switch coupled to the electronic circuit, first and second output leads, the first lead coupled to a source of electrical energy and the second lead coupled to a reference potential via the electronic switch, the electronic circuit operative to place the electronic switch in a high impedance state whenever the magnetoresistive element senses the magnetic field and to place the electronic switch in a low impedance state whenever the magnetoresistive element does not sense the magnetic field, thereby placing the reference potential upon the second output lead.

16. The apparatus of claim 15 wherein the at least one tilt cylinder is hydraulically actuated by the control means, the control means further comprising:

a source of hydraulic fluid;

a tilt control valve having a hydraulic input coupled to the source of hydraulic fluid, a hydraulic output and a command input coupled for receipt of manual requests for tilting in preselected directions, the tilt control valve arranged for selectively directing flow of the hydraulic fluid between the hydraulic input and the hydraulic output in accordance with received manual requests; and solenoid valve means coupled between the hydraulic output and the at least one tilt cylinder, the solenoid valve means having an actuating coil coupled across the first and second output leads of the sensor means, the solenoid valve means operative upon energization of its actuating coil to permit flow of the hydraulic fluid to and from the tilt cylinder.

17. The apparatus of claim 16 wherein the control means further comprises a pilot operated check valve coupled between the solenoid valve means and the at least one tilt cylinder and operative in the absence of hydraulic fluid flow to and from the solenoid valve means to maintain a position of a piston associated with the at least one tilt cylinder.

* * * * *